(12) United States Patent
Wong

(10) Patent No.: US 11,611,296 B1
(45) Date of Patent: Mar. 21, 2023

(54) VERTICAL MAGNETIC POWER GENERATOR

(71) Applicant: Shou-Cheng Wong, Kaohsiung (TW)

(72) Inventor: Shou-Cheng Wong, Kaohsiung (TW)

(*) Notice: Subject to any disclaimer, the term of this patent is extended or adjusted under 35 U.S.C. 154(b) by 0 days.

(21) Appl. No.: 17/588,210

(22) Filed: Jan. 28, 2022

(51) Int. Cl.
 *H02N 15/00* (2006.01)
 *H02K 21/24* (2006.01)
 *H02K 7/18* (2006.01)
 *H02K 16/00* (2006.01)

(52) U.S. Cl.
 CPC .......... *H02N 15/00* (2013.01); *H02K 7/1807* (2013.01); *H02K 16/00* (2013.01); *H02K 21/24* (2013.01)

(58) Field of Classification Search
 CPC ...... H02K 21/24; H02K 7/1807; H02K 16/00; H02K 7/04; H02K 2213/12; H02N 15/00
 See application file for complete search history.

(56) References Cited

U.S. PATENT DOCUMENTS

| | | | | |
|---|---|---|---|---|
| 5,506,459 A | * | 4/1996 | Ritts | F16C 39/063 446/256 |
| 5,818,131 A | * | 10/1998 | Zhang | F04B 39/0016 310/90.5 |
| 2018/0069452 A1 | * | 3/2018 | Wong | H02K 7/09 |
| 2018/0351446 A1 | * | 12/2018 | Wong | H02K 16/00 |

FOREIGN PATENT DOCUMENTS

TW   M535425 U   *   1/2017

* cited by examiner

Primary Examiner — Mohamad A Musleh
(74) Attorney, Agent, or Firm — Hershkovitz & Associates, PLLC; Abe Hershkovitz

(57) ABSTRACT

A vertical magnetic power generator has a base, a driving shaft vertically mounted in the base, at least one electricity generation module mounted in the base and connected with the driving shaft, and multiple magnetic levitation modules mounted in the base and connected with the driving shaft. Each magnetic levitation module includes a magnetic ring and a conical magnetic block disposed in the magnetic ring. The conical magnetic block and a conical hole of the magnetic ring both taper off from top to bottom. The magnetic levitation modules provide upward axial magnetic levitation forces and radial damping forces exerting toward the driving shaft to allow the driving shaft to balance a total weight applied on the driving shaft. Thus, the driving shaft is able to be vertically levitated in the base magnetically and stably rotates at high speed almost without friction loss and without shifting or vibrating.

10 Claims, 8 Drawing Sheets

VERTICAL MAGNETIC POWER GENERATOR

BACKGROUND OF THE INVENTION

1. Field of the Invention

The present invention relates to a magnetic levitation power generator, especially to a vertical magnetic power generator.

2. Description of the Prior Art(s)

An electric power generator is a device that transmits kinetic energy from an energy source to an electricity generation module through a transmission mechanism. The electricity generation module transforms the kinetic energy to electric energy for storage or delivering to users. However, in the process of transmitting the kinetic energy, the kinetic energy may lose due to friction between components of the transmission mechanism. Moreover, when a driving shaft of the transmission mechanism rotates, rotational stability of the driving shaft may be affected by the friction, leading to poor power generation efficiency of the electric power generator.

To solve the problems that the kinetic energy would lose due to the friction when being transmitted by the transmission mechanism of the electric power generator and due to weight, multiple kinds of conventional magnetic levitation power generators have been provided. Each of the conventional magnetic levitation power generators reduces the friction by a specially designed magnetic levitation transmission mechanism. However, during operation, rotation of the magnetic levitation transmission mechanism still accompanies axial or radial vibration and would be affected by the weight. Especially, when the magnetic levitation transmission mechanism rotates at high speed, it is hard to control rotational stability of the magnetic levitation transmission mechanism. Therefore, a combination structure of multiple magnetic levitation modules and multiple radial vibration-proof modules is needed. Said combinational structure is complex and is too heavy for a driving shaft. Consequently, it is not easy to balance weight and radial vibration force applied on the driving shaft.

To overcome the shortcomings, the present invention provides a vertical magnetic power generator to mitigate or obviate the aforementioned problems.

SUMMARY OF THE INVENTION

The main objective of the present invention is to provide a vertical magnetic power generator having a base, a driving shaft, at least one electricity generation module, and multiple magnetic levitation modules.

The base has a central axis and multiple base panels. The central axis is defined along an up-down direction. An axial direction is defined parallel to the central axis and a radial direction is defined orthogonal to the central axis. The driving shaft is rotatably mounted in the base without contacting the base and extends along the central axis of the base.

The at least one electricity generation module is mounted in the base and is connected with the driving shaft. Each of the at least one electricity generation module includes an electric energy generation unit mounted in the base and a permanent magnetic rotating component mounted on the driving shaft. The permanent magnetic rotating component is rotatable along with the driving shaft to induce electric currents in the electric energy generation unit.

The magnetic levitation modules are mounted in the base and at least disposed at an upper section and a lower section of the base. Each of the magnetic levitation modules includes a magnetic ring and a conical magnetic block. The magnetic ring is made of permanent magnet, is securely mounted in the base panel and has a conical hole tapering off from top to bottom. The conical magnetic block is made of permanent magnet, is securely mounted on the driving shaft and is disposed in the conical hole of the magnetic ring. The conical magnetic block and the conical hole of the magnetic ring have cone angles that match each other. N pole and S pole of each of the conical magnetic block and the magnetic ring are arranged along the axial direction. The N poles of the conical magnetic block and the magnetic ring correspond in position to each other along the radial direction and the S poles of the conical magnetic block and the magnetic ring correspond in position to each other along the radial direction, such that the conical magnetic block and the magnetic ring repel and the conical magnetic block is magnetically levitated in the conical hole of the magnetic ring.

The multiple magnetic levitation modules provide upward axial magnetic levitation forces and radial damping forces exerting toward the driving shaft to allow the driving shaft to balance a total weight of the driving shaft and the permanent magnetic rotating component, the conical magnetic block that are mounted on the driving shaft. Thus, the driving shaft is able to be vertically levitated in the base magnetically and rotates almost without friction loss and without shifting or vibrating, so as to ensure that the driving shaft can stably rotate at high speed.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
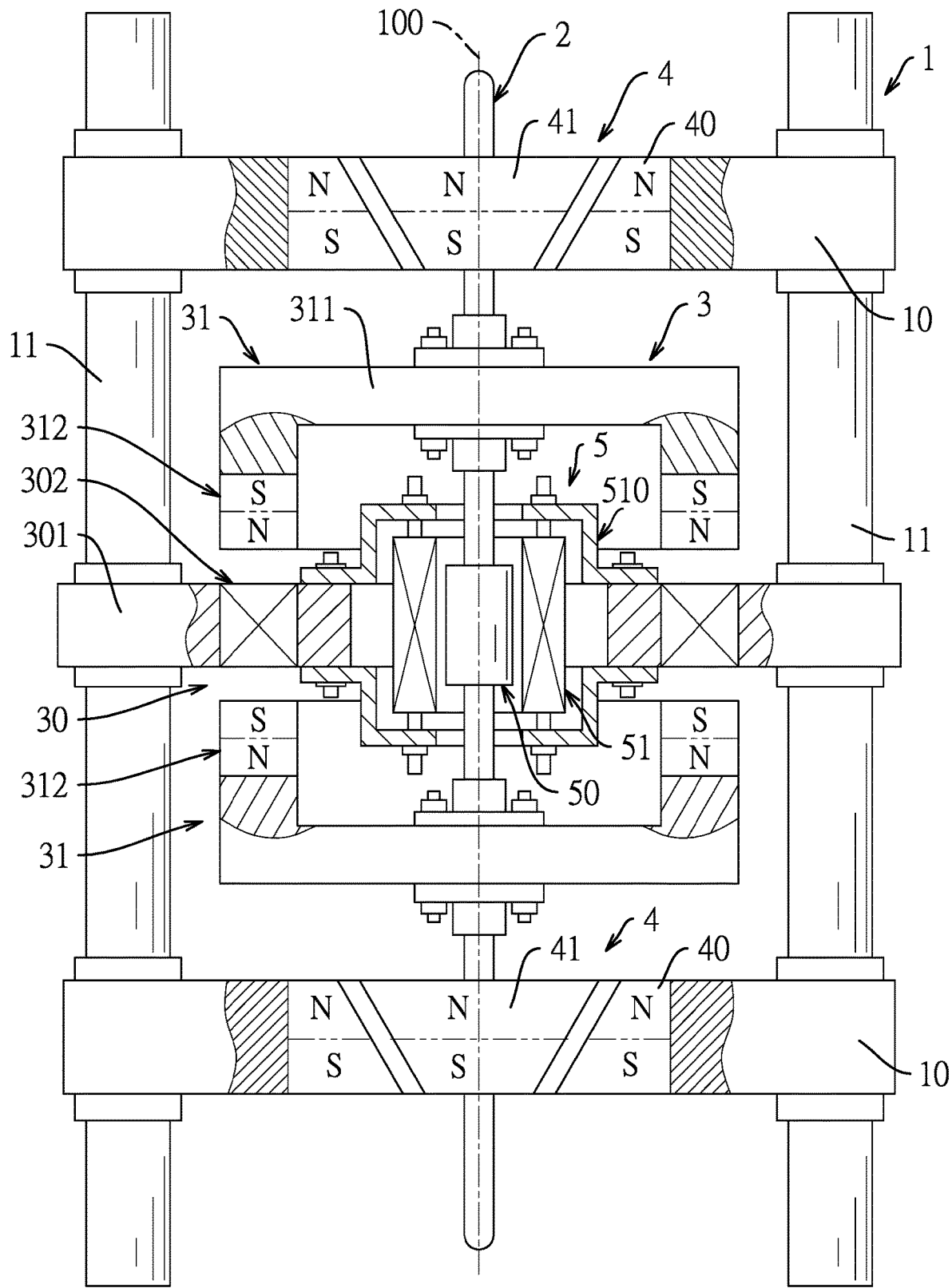
FIG. 1 is a side plane view of a first embodiment of a vertical magnetic power generator in accordance with the present invention.
Figure 2:
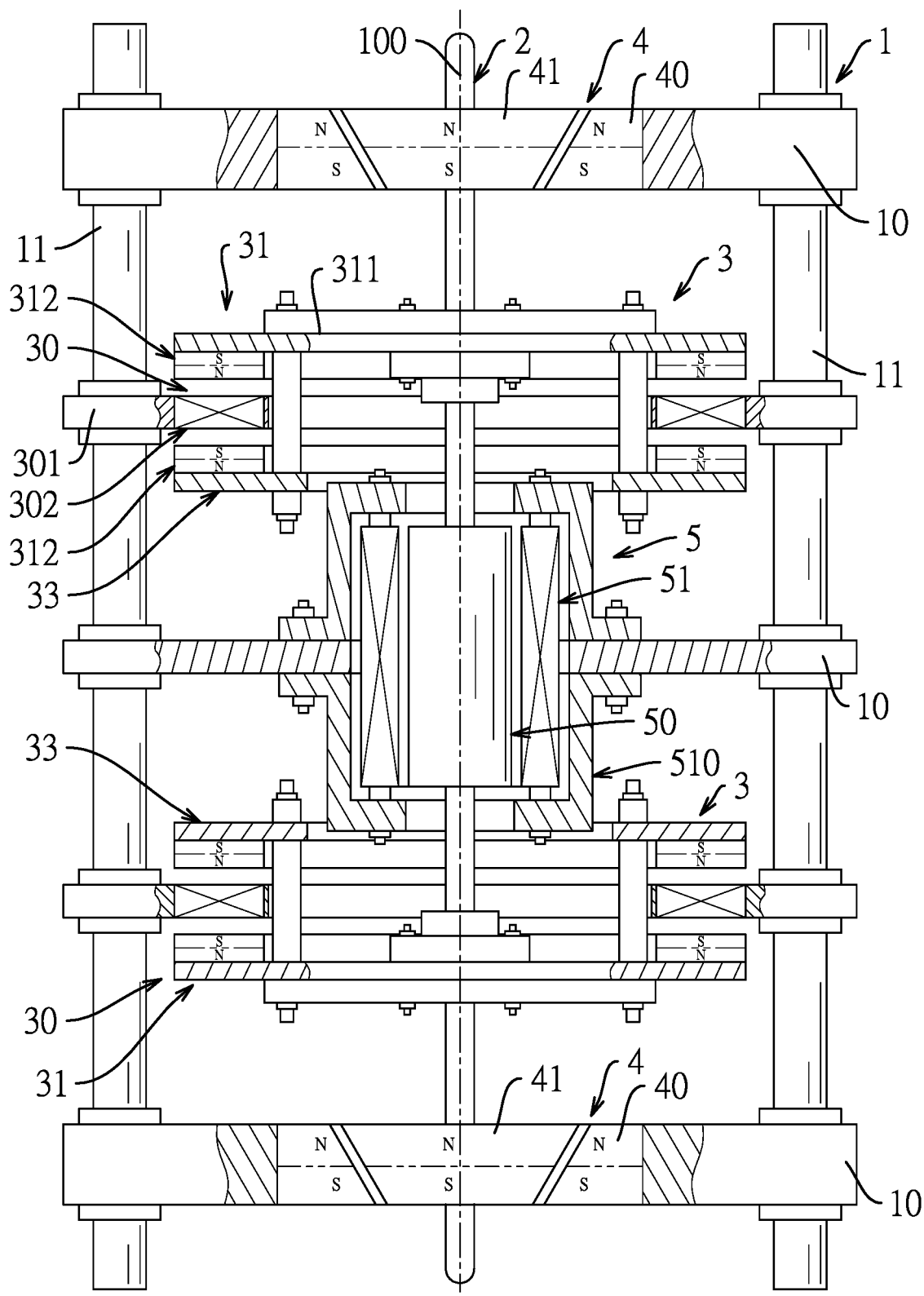
FIG. 2 is a side plane view of a second embodiment of a vertical magnetic power generator in accordance with the present invention.
Figure 3:
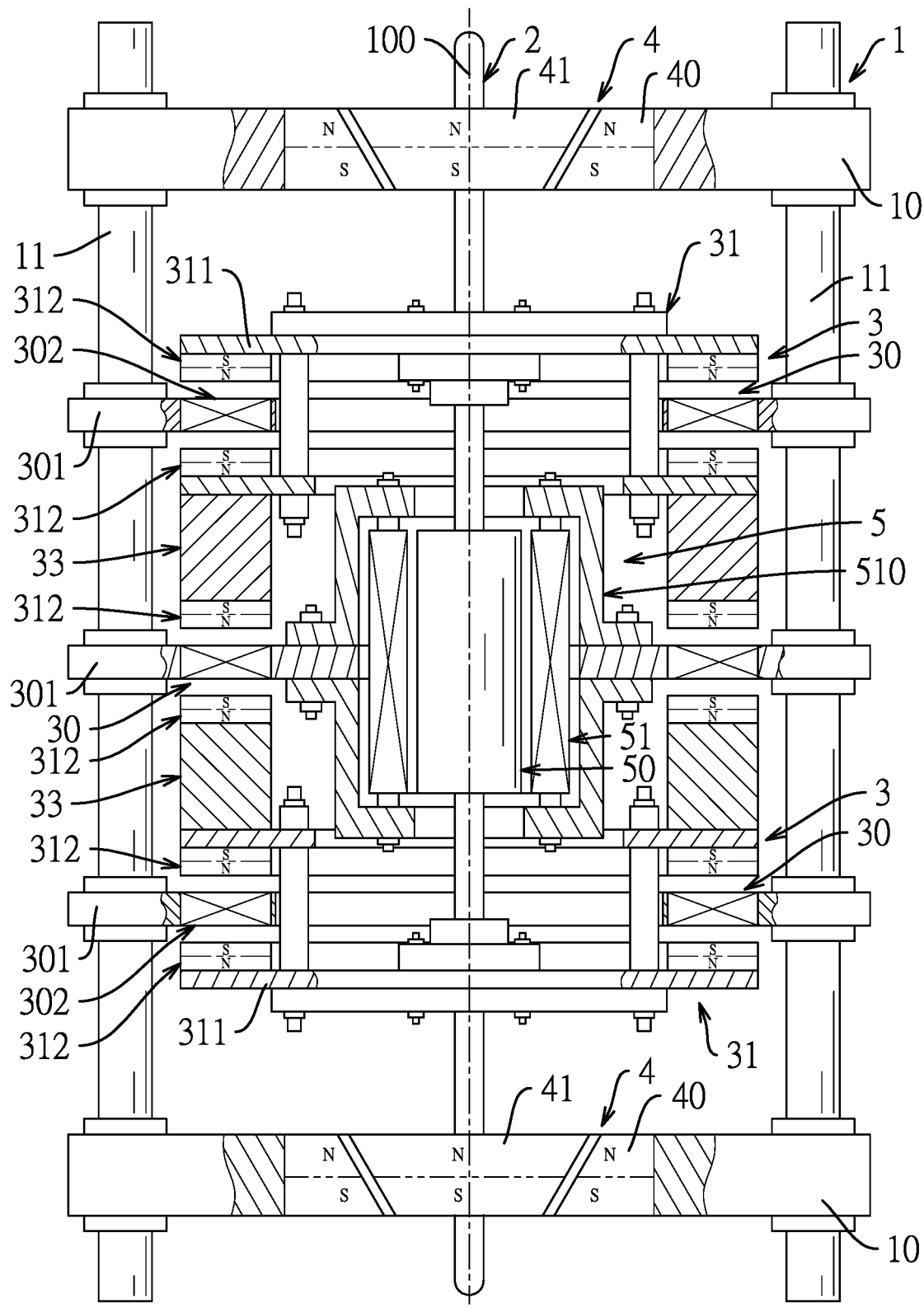
FIG. 3 is a side plane view of a third embodiment of a vertical magnetic power generator in accordance with the present invention.

With reference to FIGS. 1 to 3, a vertical magnetic power generator in accordance with the present invention comprises a base 1, a driving shaft 2, at least one electricity generation module 3, and multiple magnetic levitation modules 4. Preferably, the vertical magnetic power generator further comprises a motor unit 5.

As shown in FIGS. 1 to 3, the base 1 has a central axis 100 defined along an up-down direction. An axial direction is defined parallel to the central axis 100. A radial direction is defined orthogonal to the central axis 100. The base 1 has a receiving space and multiple base panels 10. The base panels 10 are separately arranged along the axial direction. In the preferred embodiments, the base 1 further has multiple struts 11 separately arranged along peripheral edges of the base panels 10. Each of the struts 11 is mounted through the base panels 10, such that the struts 11 support the base panels 10 together. A number of the struts 11 is set according to the actual needs of the vertical magnetic power generator, so that the struts 11 are able to support the whole vertical magnetic power generator stably.

A number of the base panels 10 is set according to a number of the magnetic levitation modules 4. As shown in FIGS. 1 to 3, in the preferred embodiments, the multiple magnetic levitation modules 4 includes two magnetic levitation modules 4, such that the multiple base panels 10 of the base 1 includes two base panels 10. Preferably, the two base panels 10 are disposed at an upper section and a lower section of the base 1 respectively. However, positions and the number of the base panels 10 are not limited to the preferred embodiments disclosed in the drawings.

The driving shaft 2 is rotatably mounted in the base 1 without contacting the base 10 and extends along the axial direction. That is, the driving shaft 2 passes through the base panels 10 of the base 1 without contacting the base panels 10. A center line of the driving shaft 2 is coaxial with the central axis 100. The vertical magnetic power generator of the present invention is connected to an external power source through the driving shaft 2, such that the driving shaft 2 can be driven to rotate.

As shown in FIGS. 1 to 3, the at least one electricity generation module 3 may include one electricity generation module 3 or a plurality of electricity generation modules 3. The electricity generation module 3 is mounted in the base 1, is connected with the driving shaft 2, and can be driven to generate electricity. A number of the electricity generation module 3 is set according to actual requirements of products.

With reference to the preferred embodiments as shown in FIGS. 1 to 3, when the vertical magnetic power generator further comprises the motor unit 5, the motor unit 5 is mounted in the base 1 and is connected with the driving shaft 2. At the beginning of the driven shaft 2 being driven or other appropriate timing, the motor unit 5 provides auxiliary rotational driving force for the driving shaft 2. Preferably, in order to allow the driving shaft 2 to rotate stably, the motor unit 5 is mounted on a middle section of the base 1.

As shown in FIGS. 1 to 3, the multiple magnetic levitation modules 4 are mounted in the receiving space of the base 1 and are connected with the driving shaft 2. Preferably, the multiple magnetic levitation modules 4 are at least disposed adjacent to a upper end and a lower end of the base 1, i.e. at the upper section and the lower section of the base 1, so as for allowing stable rotation.

Each of the magnetic levitation modules 4 is mounted between a respective one of the base panels 10 of the base 1 and the driving shaft 2 and includes a magnetic ring 40 and a conical magnetic block 41. The magnetic ring 40 and the conical magnetic block 41 are made of permanent magnet. The magnetic ring 40 is securely mounted in the base panel 10 and has a conical hole. The conical hole tapers off from top to bottom. The conical magnetic block 41 is securely mounted on the driving shaft 2 and is disposed in the conical hole of the magnetic ring 40. The conical magnetic block 41 and the conical hole of the magnetic ring 40 have cone angles that match each other.

N pole and S pole of each of the conical magnetic block 41 and the magnetic ring 40 are arranged along the axial direction (the up-down direction). The N poles of the conical magnetic block 41 and the magnetic ring 40 correspond in position to each other along the radial direction and the S poles of the conical magnetic block 41 and the magnetic ring 40 correspond in position to each other along the radial direction, such that the conical magnetic block 41 and the magnetic ring 40 repel. An air gap is formed between a peripheral surface of the conical magnetic block 41 and a hole wall defined around the conical hole of the magnetic ring 40. That is, the conical magnetic block 41 is magnetically levitated in the conical hole of the magnetic ring 40 without contacting the hole wall defined around the conical of the magnetic ring 40.

In the preferred embodiments, the N pole and S pole of the conical magnetic block 41 are arranged along the axial direction, and the N pole and the S pole of the magnetic ring 40 are arranged along the axial direction (the up-down direction). An arrangement of the N pole and S pole of the conical magnetic block 41 are the same as an arrangement of the N pole and the S pole of the magnetic ring 40. With reference to the preferred embodiments as shown in FIGS. 1 to 3, when the S pole of the conical magnetic block 41 is disposed lower than the N pole of the conical magnetic block 41, the S pole of the magnetic ring 40 is also disposed lower than the N pole of the magnetic ring 4. The N poles of the conical magnetic block 41 and the magnetic ring 40 correspond in position to each other along the radial direction and the S poles of the conical magnetic block 41 and the magnetic ring 40 correspond in position to each other along the radial direction, such that the conical magnetic block 41 and the magnetic ring 40 repel.

Figure 4:
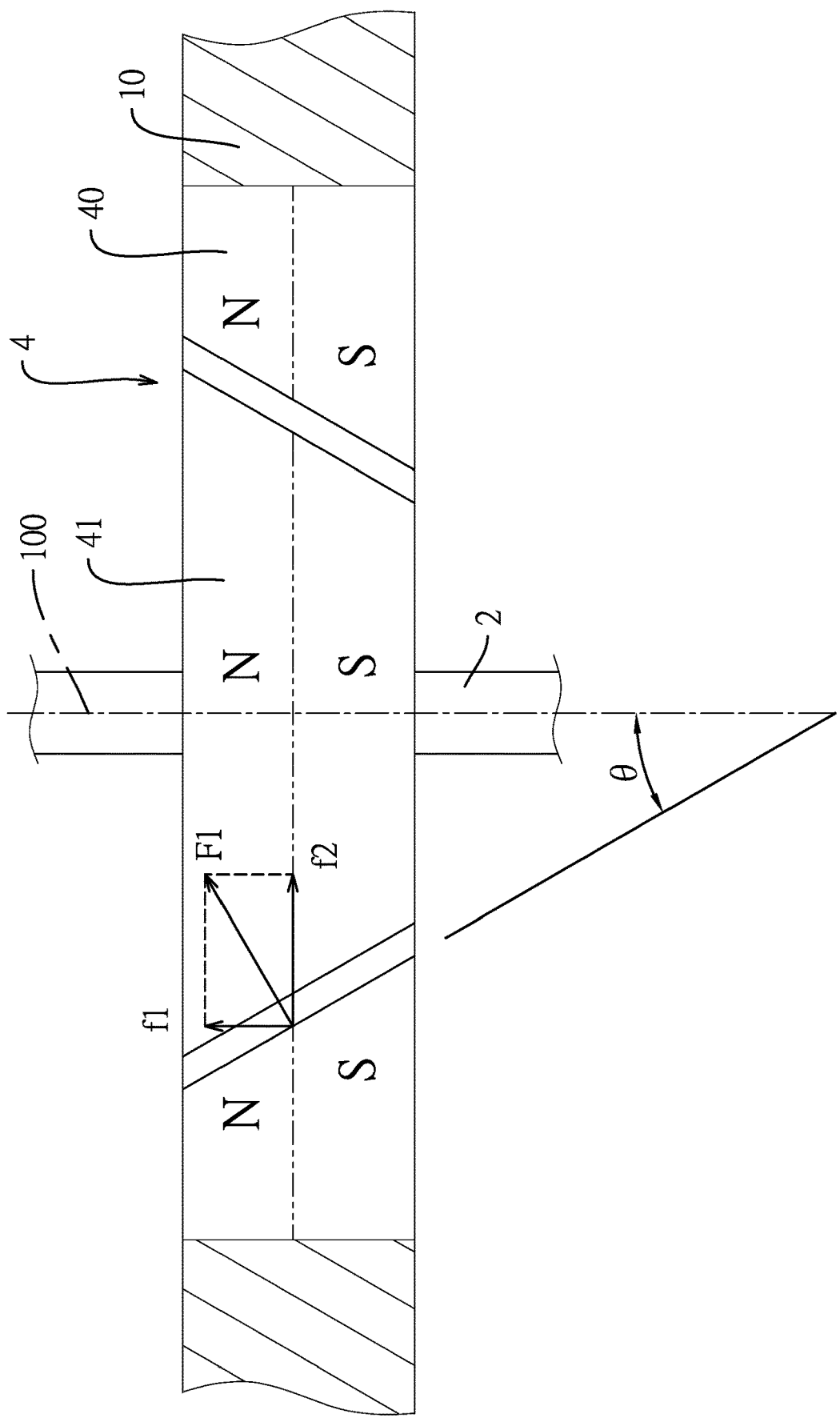
FIG. 4 is an enlarged side plane view of the vertical magnetic power generator in any one of FIGS. 1 to 3.

A cone half angle of the conical magnetic block 41 and a cone half angle of the conical hole of the magnetic ring 40 match each other. As shown in FIG. 4, preferably, each of the cone half angles θ of the conical magnetic block 41 and the conical hole of the magnetic ring 40 ranges from 15 degrees to 30 degrees (including the endpoint valves). A magnetic repulsive force F1 that the magnetic ring 40 exerts onto a conical surface of the conical magnetic block 41 in a normal direction is divided into an axial component force f1 that is parallel to the axial direction of the driving shaft 2 and a radial component force f2 that is perpendicular to the axial direction of the driving shaft 2 and exerts toward the driving shaft 2. Thus, the multiple magnetic levitation modules 4 in the base 1 provide upward axial magnetic levitation forces (the axial component forces f1) and radial damping forces (the radial component forces f2) exerting toward the driving shaft 2 to allow the driving shaft 2 to rotate stably at high speed. The cone half angles θ of the conical magnetic block 41 and the conical hole of the magnetic ring 40 can be set according to actual requirements of the vertical magnetic power generator. For instance, by adjusting the cone half angles θ of the conical magnetic block 41 and the conical hole of the magnetic ring 40, the larger upward axial magnetic levitation forces or the larger radial damping forces can be provided.

As shown in FIGS. 1 to 3, the at least one electricity generation module 3 may include one electricity generation module 3 or a plurality of electricity generation modules 3. The number of the electricity generation module 3 can be set according to the actual requirements of the products. Each of the at least one electricity generation module 3 includes an electric energy generation unit 30 and a permanent magnetic rotating component 31. The electric energy generation unit 30 is mounted in the base 1 and has multiple induction coil windings 302. The induction coil windings 302 are arranged at equiangular intervals along a circular path surrounding the central axis 100. The permanent magnetic rotating component 31 is mounted on the driving shaft 2 and has multiple cell magnetic blocks 312 arranged along the circular path. Thus, when the permanent magnetic rotating component 31 rotates relative to the electric energy generation unit 30, electric current is induced in the induction coil windings 302 of the electric energy generation unit 30.

In the first preferred embodiment as shown in FIG. 1, the vertical magnetic power generator comprises one electricity generation module 3. The electricity generation module 3 includes the electric energy generation unit 30 and the permanent magnetic rotating component 31.

The electric energy generation unit 30 includes a supporting panel 301 and multiple induction coil windings 302. The supporting panel 301 is securely mounted in the base 1. The driving shaft 2 is mounted through a center of the supporting panel 301 without contacting the supporting panel 301. The multiple induction coil windings 302 are mounted on the supporting panel 301 and are arranged at equiangular intervals along a circular path surrounding the central axis 100. The multiple induction coil windings 302 are disposed on a periphery of the driving shaft 2.

A number of the permanent magnetic rotating component 31 can be set according to actual requirements of the vertical magnetic power generator. Each permanent magnetic rotating component 31 has two rotating parts 311 and multiple cell magnetic blocks 312. The rotating parts 311 are made of non-magnetic material. Preferably, the rotating parts 311 may be made of non-magnetic metal material such as aluminum alloys or copper alloys. The two rotating parts 311 are securely mounted to the driving shaft 2 and are disposed above and below the supporting panel 301 respectively. The multiple cell magnetic blocks 312 are mounted on the two rotating parts 311 and are arranged along the circular path. Each of the cell magnetic blocks 312 that is mounted on one of the rotating parts 311 corresponds in position to one of the cell magnetic blocks 312 that is mounted on the other rotating part 311.

An air gap is formed between one of the cell magnetic blocks 312 and one of the induction coil windings 302 that correspond in position to each other. Two of the cell magnetic blocks 312 that correspond in position with each other face toward the induction coil windings 302 with different poles, such that magnetic force between said two cell magnetic blocks 312 that correspond in position with each other passes through the induction coil windings 302 on the supporting panel 301.

In the second preferred embodiment as shown in FIG. 2, the vertical magnetic power generator comprises two electricity generation modules 3. The two electricity generation modules 3 are separately arranged along the axial direction. Each of the electricity generation modules 3 includes the electric energy generation unit 30 and the permanent magnetic rotating component 31.

The electric energy generation unit 30 includes a supporting panel 301 and multiple induction coil windings 302. The supporting panel 301 is securely mounted in the base 1. The driving shaft 2 is mounted through a center of the supporting panel 301 without contacting the supporting panel 301. The multiple induction coil windings 302 are mounted on the supporting panel 301 and are arranged at equiangular intervals along a circular path surrounding the central axis 100. The multiple induction coil windings 302 are disposed on a periphery of the driving shaft 2.

A number of the permanent magnetic rotating component 31 can be set according to actual requirements of the vertical magnetic power generator. Each permanent magnetic rotating component 31 has a rotating part 311, a linking part 33, and multiple cell magnetic blocks 312. The rotating part 311 and the linking part 33 are made of non-magnetic material. Preferably, the rotating part 311 and the linking part 33 may be made of non-magnetic metal material such as aluminum alloys or copper alloys. The rotating part 33 is securely mounted to the driving shaft 2 and is disposed above the supporting panel 301. The linking part 33 is connected with the rotating part 311 and is disposed below the supporting panel 301. The cell magnetic blocks 312 are mounted on the rotating part 311 and the linking part 33, and are arranged along the circular path. Each of the cell magnetic blocks 312 that is mounted on the rotating part 311 corresponds in position to one of the cell magnetic blocks 312 that is mounted on the linking part 33.

An air gap is formed between one of the cell magnetic blocks 312 and one of the induction coil windings 302 that correspond in position to each other. Two of the cell magnetic blocks 312 that correspond in position with each other face toward the induction coil windings 302 with different poles, such that magnetic force between said two cell magnetic blocks 312 that correspond in position with each other passes through the induction coil windings 302 on the supporting panel 301.

In the third preferred embodiment as shown in FIG. 3, one electric energy generation unit 30 is further added and is disposed between the two electricity generation modules 3. A side, which faces toward the added electric energy generation unit 30, of each of the linking parts 33 of the permanent magnetic rotating components 31 of the two electricity generation modules 3 is mounted with multiple cell magnetic blocks 312. Said cell magnetic blocks 312 are disposed above and below the circular path for arranging the induction coil windings 302 on the supporting panel 301 of the added electric energy generation unit 30. An air gap is formed between one of the cell magnetic blocks 312 and one of the induction coil windings 302 that correspond in position to each other. Two of the cell magnetic blocks 312 that correspond in position with each other face toward the induction coil windings 302 with different poles, such that magnetic force between said two cell magnetic blocks 312 that correspond in position with each other passes through the induction coil windings 302 on the supporting panel 301.

Figure 7:
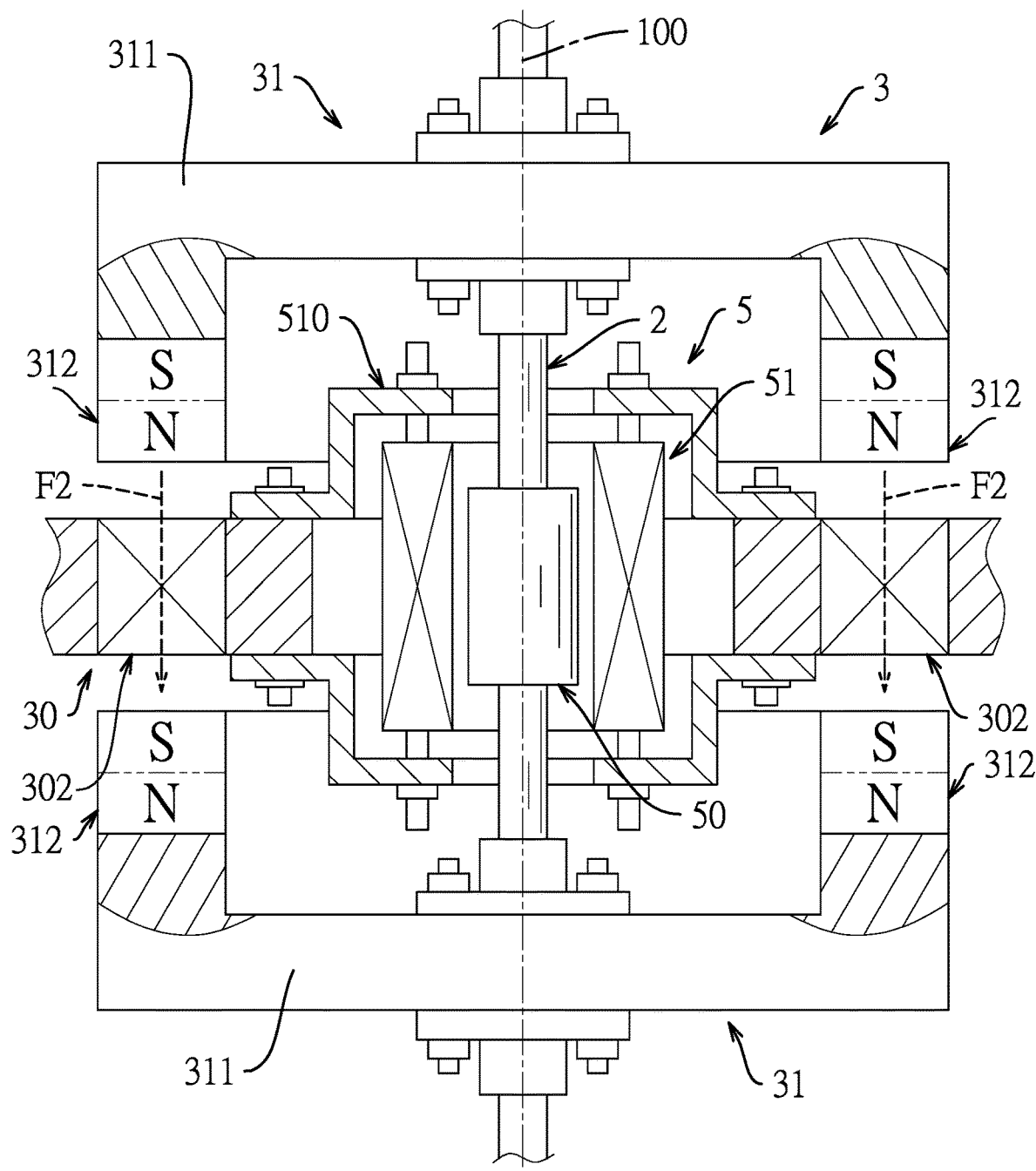
FIG. 7 is an enlarged side plane view of an electricity generation module of the vertical magnetic power generator in FIG. 1.
Figure 8:
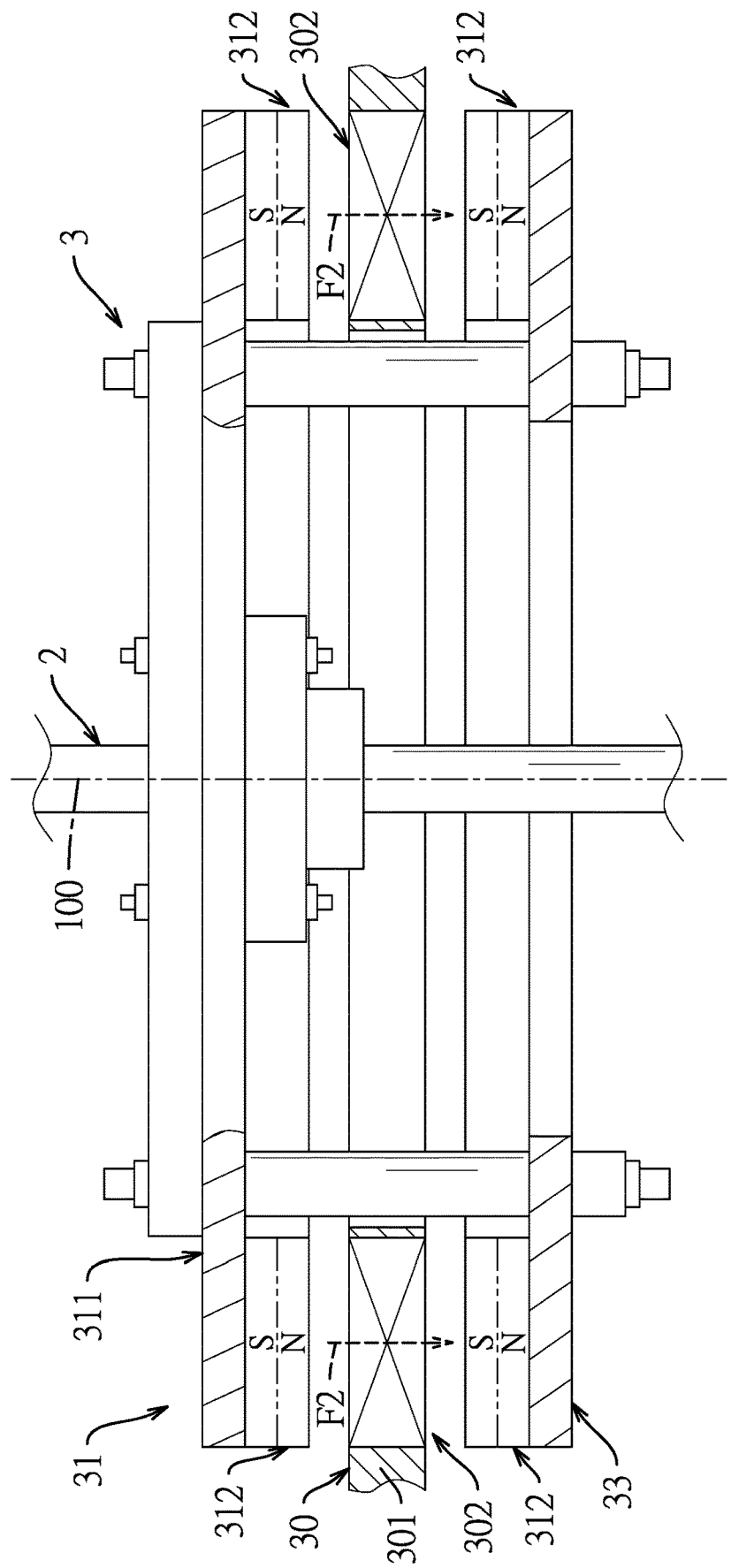
FIG. 8 is an enlarged side plane view of an electricity generation module of the vertical magnetic power generator in FIG. 2.

In the preferred embodiments as shown in FIGS. 1 to 3, for each of the cell magnetic blocks 312 that is disposed above the induction coil windings 302, the S pole is disposed above the N pole; and for each of the cell magnetic blocks 312 that is disposed below the induction coil windings 302, the S pole is disposed above the N pole. As shown in FIGS. 7 and 8, magnetic force between each two of the cell magnetic blocks 312, which correspond in position with each other, is exerted downward from the N pole to the S pole to pass through the induction coil windings 302. Thus, when each permanent magnetic rotating component 31 of the electricity generation module 3 is driven to rotate, electric current is generated in the induction coil windings 302.

Figure 5:
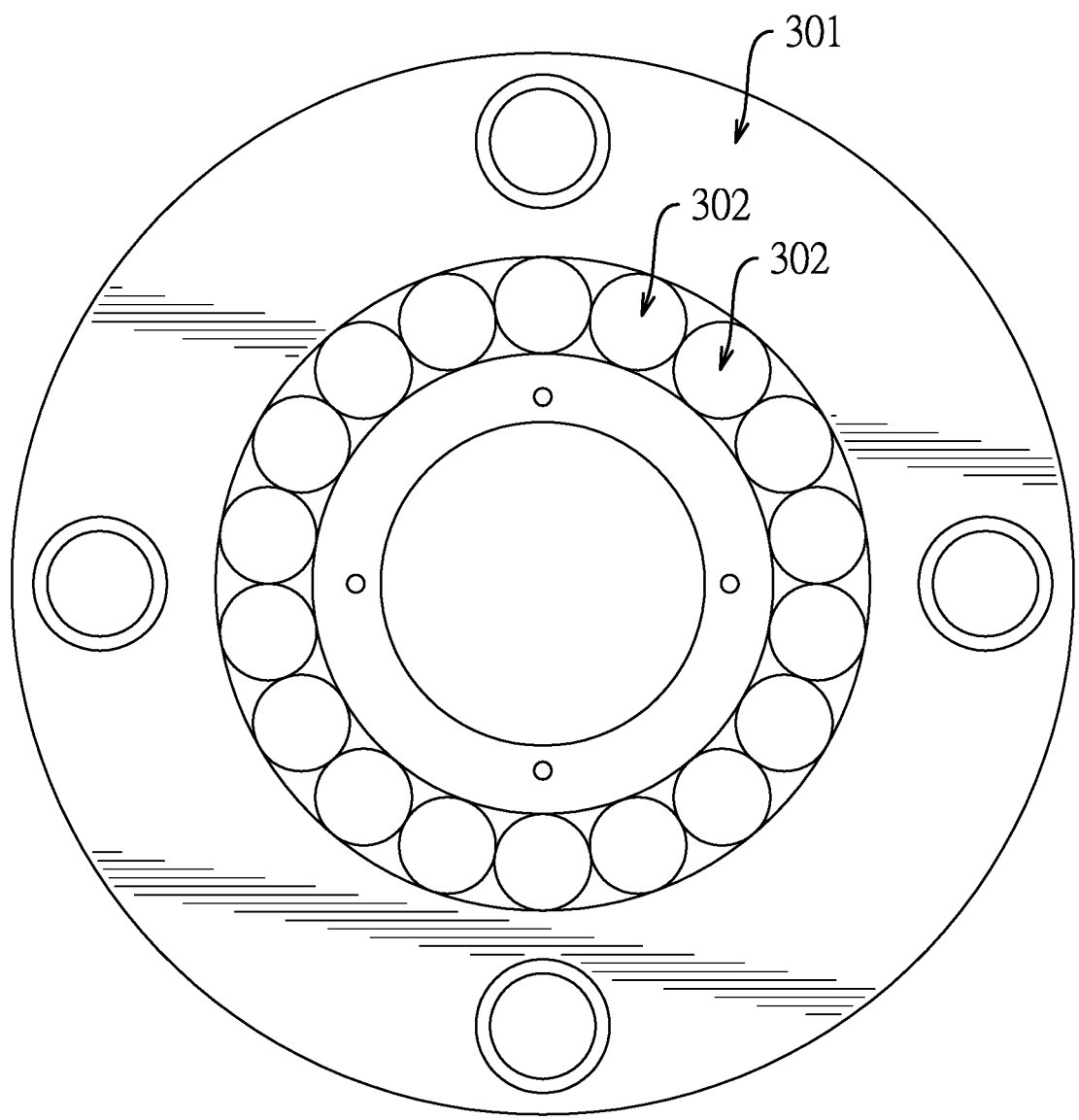
FIG. 5 is a top plane view of an electric energy generation unit of the vertical magnetic power generator in FIG. 1.
Figure 6:
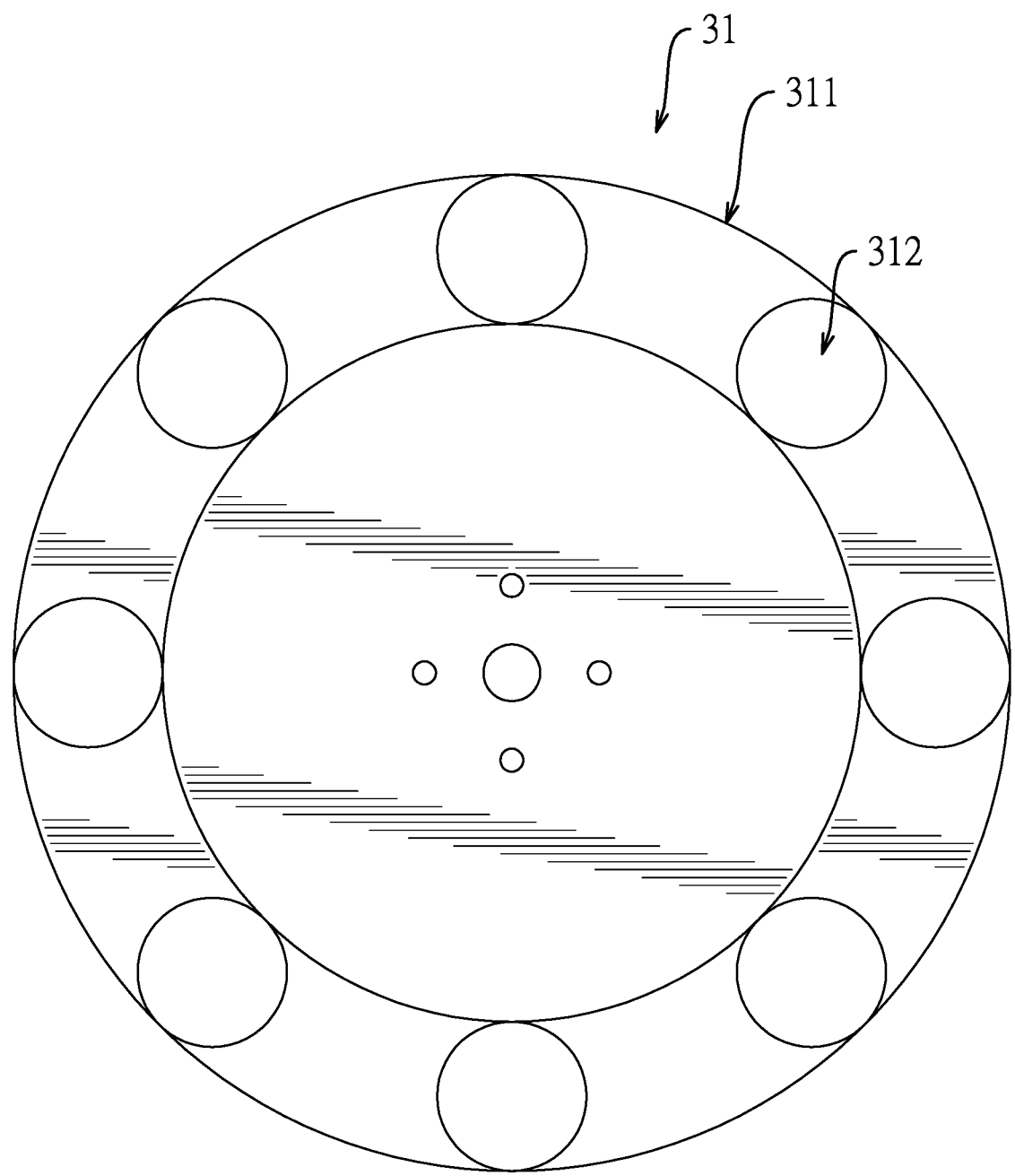
FIG. 6 is a bottom plane view of a permanent magnetic rotating component of the vertical magnetic power generator in FIG. 1.

With reference to FIGS. 5 and 6, in each electricity generation module 3 of the preferred embodiments as shown in FIGS. 1 to 3, a number of the cell magnetic blocks 312 of each permanent magnetic rotating component 31 is less than a number of the induction coil windings 302. The number of the induction coil windings 302 is a positive integer multiple of the number of the cell magnetic blocks 312. For instance, when the number of the cell magnetic blocks 312 of the permanent magnetic rotating component 31 is three, the number of the induction coil windings 302 is six; when the number of the cell magnetic blocks 312 of the permanent magnetic rotating component 31 is four, the number of the induction coil windings 302 is eight; and so on and so forth.

As shown in FIG. 5, the multiple induction coil windings 302 are closely arranged one by one around the driving shaft 2. As shown in FIG. 6, the multiple cell magnetic blocks 312 are separately arranged around the driving shaft 2. Furthermore, in order to enable the electric energy generation unit 30 to be used to generate larger electric currents, each of the induction coil windings 302 is a flat helical winding that is made of flat copper wire.

In the first preferred embodiment as shown in FIG. 1, the vertical magnetic power generator comprises one motor unit 5. The motor unit 5 includes a motor rotor 50 and a motor coil winding 51. The motor rotor 50 is securely mounted on the driving shaft 2. The motor coil winding 51 is assembled to the supporting panel 301 via a connecting frame 510 and is disposed between the two rotating parts 311 of the permanent magnetic rotating component 31 of the electric energy generation unit 30. The motor coil winding 51 is securely mounted in the base 1 through the supporting panel 301 and is mounted around the motor rotor 50. An air gap is formed between the motor coil winding 51 and the motor rotor 50. The motor coil winding 51 may be electrically connected to a power supply, so as to form magnetic force that drives a transmission shaft of the motor rotor 50 to rotate.

In the second and third preferred embodiments as shown in FIGS. 2 and 3, the vertical magnetic power generator comprises two electricity generation modules 3 and one motor unit 5 disposed between the two electricity generation modules 3. The motor unit 5 includes a motor rotor 50 and a motor coil winding 51. The motor rotor 50 is securely mounted on the driving shaft 2. The motor coil winding 51 is assembled to one of the base panels 10 of the base 1 or the supporting panel 301 via a connecting frame 510 and is disposed between the two rotating parts 311 of the permanent magnetic rotating component 31 of the electric energy generation unit 30. An air gap is formed between the motor coil winding 51 and the motor rotor 50. The motor coil winding 51 may be electrically connected to a power supply, so as to form magnetic force that drives a transmission shaft of the motor rotor 50 to rotate.

In the preferred embodiments as shown in FIGS. 1 to 3, the motor rotor 50 of the motor unit 5 is made of non-magnetic material, such as aluminum alloys or copper alloys, so as to allow the motor unit 5 to have better driving performance. Making the motor rotor 50 by using the non-magnetic material and combining the motor rotor 50 and the motor coil winding 51 are conventional techniques, and thus further details are omitted.

With reference to FIGS. 1 to 3, 7 and 8, when the vertical magnetic power generator of the present invention is in use, the driving shaft 2 is connected to the external power source, so as to provide kinetic energy that drives the driving shaft 2 to rotate. Otherwise, the motor unit 5 that is driven by the power supply may provide the auxiliary rotational driving force for the driving shaft 2 at the beginning of the driven shaft 2 being driven or other appropriate timing. When the driving shaft 2 reaches and runs at a predetermined speed, the motor unit 5 stops providing the auxiliary rotational driving force.

During operation and power generation, the multiple magnetic levitation modules 4 provide the upward axial magnetic levitation forces and the radial damping forces exerting toward the driving shaft 2 to allow the driving shaft 2 to rotate without friction loss. Moreover, the upward axial magnetic levitation forces balance a total weight of the driving shaft 2 and the permanent magnetic rotating component 31 of each of the at least one electricity generation module 3, the conical magnetic block 41 and the motor 50 that are mounted on the driving shaft 2, such that the driving shaft 2 is able to be vertically levitated in the base 1 magnetically and rotates almost without friction loss. On the other hand, the radial damping forces provides by the multiple magnetic levitation modules 4 and exerting toward the driving shaft 2 effectively prevents the driving shaft 2 from shifting or vibrating, so as to ensure that the driving shaft 2 can stably rotate at high speed.

In addition, in the permanent magnetic rotating component 31 of each of the at least one electricity generation module 3, the magnetic force between each two of the cell magnetic blocks 312 that correspond in position with each other passes through the induction coil windings 302 of the electric energy generation unit 30. Therefore, when the permanent magnetic rotating component 31 of each of the at least one electricity generation module 3 along with the driving shaft 2 rotates at high speed, each two of the cell magnetic blocks 312 that correspond in position with each other rotate relative to the induction coil windings 302 of the electric energy generation unit 30 to produce induced electromotive force and generate electric power.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A vertical magnetic power generator comprising:
   a base having
      a central axis defined along an up-down direction, wherein an axial direction is defined parallel to the central axis and a radial direction is defined orthogonal to the central axis; and
      multiple base panels;
   a driving shaft rotatably mounted in the base without contacting the base and extending along the central axis of the base;
   at least one electricity generation module mounted in the base and connected with the driving shaft, and each of the at least one electricity generation module including
      an electric energy generation unit mounted in the base; and
      a permanent magnetic rotating component mounted on the driving shaft and being rotatable along with the driving shaft to induce electric currents in the electric energy generation unit;
   multiple magnetic levitation modules mounted in the base and at least disposed at an upper section and a lower section of the base, and each of the magnetic levitation modules including a magnetic ring made of permanent magnet, securely mounted in the base panel and having a conical hole tapering off from top to bottom; and a conical magnetic block made of permanent magnet, securely mounted on the driving shaft and disposed in the conical hole of the magnetic ring, wherein the conical magnetic block and the conical hole of the magnetic ring have cone angles that match each other;

wherein N pole and S pole of each of the conical magnetic block and the magnetic ring are arranged along the axial direction; and the N poles of the conical magnetic block and the magnetic ring correspond in position to each other along the radial direction and the S poles of the conical magnetic block and the magnetic ring correspond in position to each other along the radial direction, such that the conical magnetic block and the magnetic ring repel and the conical magnetic block is magnetically levitated in the conical hole of the magnetic ring.

2. The vertical magnetic power generator as claimed in claim 1, wherein a cone half angle of the conical magnetic block ranges from 15 degrees to 30 degrees; and a cone half angle of the conical hole of the magnetic ring ranges from degrees to 30 degrees.

3. The vertical magnetic power generator as claimed in claim 2, wherein the electric energy generation unit includes a supporting panel securely mounted in the base; and multiple induction coil windings mounted on the supporting panel and arranged at equiangular intervals along a circular path surrounding the central axis, wherein the multiple induction coil windings are disposed on a periphery of the driving shaft;

each permanent magnetic rotating component has two rotating parts securely mounted to the driving shaft and disposed above and below the supporting panel 301 respectively; and multiple cell magnetic blocks mounted on the two rotating parts and arranged along the circular path, and each of the cell magnetic blocks that is mounted on one of the rotating parts corresponding in position to one of the cell magnetic blocks that is mounted on the other rotating part;

an air gap is formed between one of the cell magnetic blocks and one of the induction coil windings that correspond in position to each other, two of the cell magnetic blocks that correspond in position with each other face toward the induction coil windings with different poles, such that magnetic force between said two cell magnetic blocks that correspond in position with each other passes through the induction coil windings on the supporting panel.

4. The vertical magnetic power generator as claimed in claim 2, wherein the electric energy generation unit includes a supporting panel securely mounted in the base; and multiple induction coil windings mounted on the supporting panel and arranged at equiangular intervals along a circular path surrounding the central axis, wherein the multiple induction coil windings are disposed on a periphery of the driving shaft;

each permanent magnetic rotating component has a rotating part securely mounted to the driving shaft and disposed above the supporting panel;

a linking part connected with the rotating part and disposed below the supporting panel; and multiple cell magnetic blocks mounted on the rotating part and the linking part and arranged along the circular path, and each of the cell magnetic blocks that is mounted on the rotating part corresponds in position to one of the cell magnetic blocks that is mounted on the linking part;

an air gap is formed between one of the cell magnetic blocks and one of the induction coil windings that correspond in position to each other, two of the cell magnetic blocks that correspond in position with each other face toward the induction coil windings with different poles, such that magnetic force between said two cell magnetic blocks that correspond in position with each other passes through the induction coil windings on the supporting panel.

5. The vertical magnetic power generator as claimed in claim 4, wherein one electric energy generation unit is further added and is disposed between the two electricity generation modules, and a side, which faces toward the added electric energy generation unit, of each of the linking parts of the permanent magnetic rotating components of the two electricity generation modules is mounted with multiple cell magnetic blocks;

said cell magnetic blocks are disposed above and below the circular path for arranging the induction coil windings on the supporting panel of the added electric energy generation unit; and an air gap is formed between one of the cell magnetic blocks and one of the induction coil windings that correspond in position to each other, and two of the cell magnetic blocks that correspond in position with each other face toward the induction coil windings with different poles, such that magnetic force between said two cell magnetic blocks that correspond in position with each other passes through the induction coil windings on the supporting panel.

6. The vertical magnetic power generator as claimed in claim 1 further comprises a motor unit mounted in the base and connected with the driving shaft.

7. The vertical magnetic power generator as claimed in claim 2 further comprises a motor unit mounted in the base and connected with the driving shaft.

8. The vertical magnetic power generator as claimed in claim 3 further comprises a motor unit including:

a motor rotor securely mounted on the driving shaft; and a motor coil winding assembled to the supporting panel, disposed between the two rotating parts of the permanent magnetic rotating component and mounted around the motor rotor.

9. The vertical magnetic power generator as claimed in claim 4 further comprises a motor unit disposed between the two electricity generation modules and including:

a motor rotor securely mounted on the driving shaft; and a motor coil winding assembled to one of the base panels of the base, disposed between the two rotating parts of the permanent magnetic rotating component and mounted around the motor rotor.

10. The vertical magnetic power generator as claimed in claim 5 further comprises a motor unit disposed between the two electricity generation modules and including:

a motor rotor securely mounted on the driving shaft; and a motor coil winding assembled to the supporting panel, disposed between the two rotating parts of the permanent magnetic rotating component and mounted around the motor rotor.

* * * * *